June 26, 1928.
W. A. MAHER
PISTON
Filed Aug. 25, 1927
1,674,733
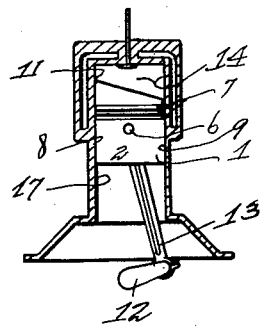
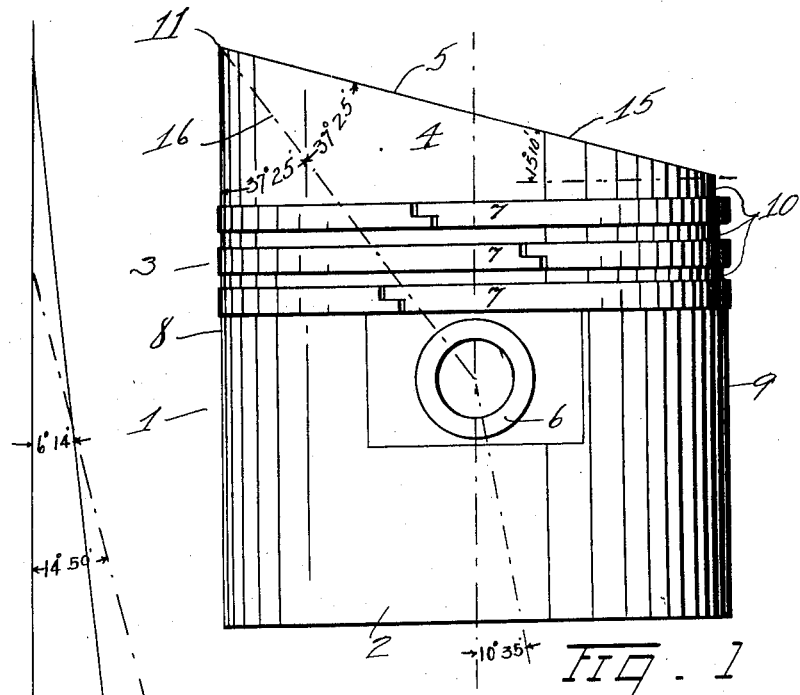
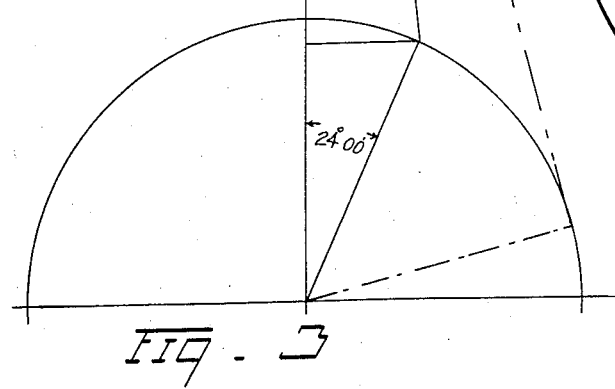
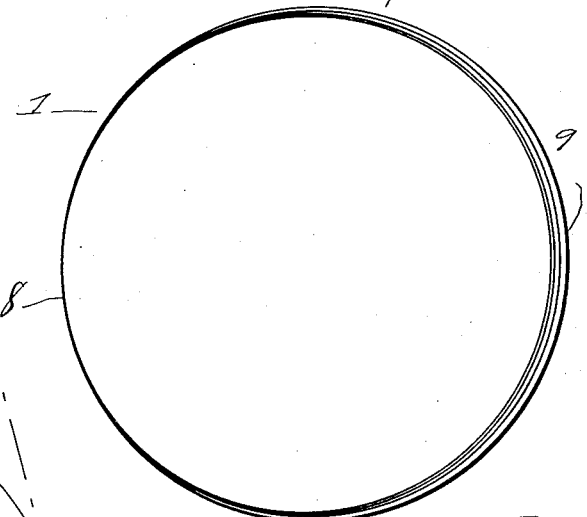
INVENTOR
William A. Maher
BY
E. Sauze
ATTORNEY Patented June 26, 1928.

1,674,733

UNITED STATES PATENT OFFICE.

WILLIAM A. MAHER, OF YAKIMA, WASHINGTON.

PISTON.

Application filed August 25, 1927. Serial No. 215,285.

This invention relates to pistons, more particularly pistons as used in internal combustion engines and has as one of its objects to provide a piston that will overcome a noise incident to a loose piston, this noise being variously termed as "piston slap," "spark knock", "labor knock" or "carbon knock".

Another object of the invention is to provide a piston whose design will tend to produce a true traveling piston and hence reduce cylinder wear.

A further object of the invention is to provide a piston whose design causes it to be held in contact with the wall of the cylinder at all times, thus reducing vibration.

A further object of the invention is to provide a piston having an increased bearing surface upon the side thereof bearing the force of the explosion.

A further object of the invention is to provide a piston proportioned to stand the strain of the explosion thus minimizing the wear of the cylinder, which in turn adds longer life to the rings, they remaining more nearly centered in their grooves without oscillation, and without the undue expansion and contraction thereof produced by a cylinder worn to a taper, and further providing greater efficiency with a more economical use of oil.

A further object of the invention is to provide a piston the design of which will prevent the ignited gas, with its attendant heat, from affecting the major portion of the ring.

A further object of the invention is to provide a piston that will withstand the forces encountered thereby providing for greatest efficiency.

With these and other objects in view references now had to the accompanying drawing in which, Fig. 1 is a side elevation of the piston;
Fig. 2 is a plan view thereof;
Fig. 3 is a diagram showing certain angles assumed by the connecting rod; and
Fig. 4 is a sectional elevation of a cylinder showing the relative location of the cylinder, piston, connecting rod, and crank-shaft.

Having reference to the drawing like numerals refer to like parts throughout the several views and the numeral 1 refers to the piston in its entirety, the piston comprising a cylindrical skirting 2, a ring bearing portion 3, a top portion 4, having a plane top 5, and a wrist-pin inserted in the skirting.

The parts enumerated above, with the exception of the wrist-pin, are integral, and a wrist-pin 6 and also rings 7 are added in and for the usual manner and purpose.

The skirting 2, as above mentioned, is cylindrical in form, in other words of a form conforming to the cylinder in which it is to be used and the ring bearing portion 3 and top 4 are of corresponding form, having however less diameter than the skirting, and these parts are positioned eccentrically with respect to the skirting with one side 8 aligned and forming an elongated side paralleling the longitudinal axis of the piston.

This design thus provides for an elongated bearing surface throughout the length of the piston on the aligned side thereof, and a short side 9 having a series of offsets 10 on the side diametrically opposite from the first mentioned side, which side 9 will be termed the off-set side.

The top portion 4 of the piston is constructed to form with the plane top 5 a right angled triangle, the apex 11 of which is located at the upper side of the piston at the termination of the aligned side before mentioned.

By referring to the diagram in Fig. 3 illustrating the position of the connecting rod, there is shown an angle of departure of 24 degrees within the circle, the circle representing the path of the crank 12 and the angle of departure being the spark angle, in other words the angle at which the charge is fired before the piston 1 reaches its maximum upper limits of the stroke, and the position of the connecting rod 13 at this moment is shown as being at an angle of 6 degrees and 14 minutes from the vertical, illustrated by the solid line, while the broken and dotted line represents the maximum angle of inclination of the connecting rod with vertical and an average of these two angles is shown in Fig. 1 and is 10 degrees and 35 minutes.

As the piston 1 is moved upward on the compression stroke it obviously encounters resistance increasing as the piston reaches the maximum point of compression and point of firing, and when the explosion occurs it affords additional resistance until the piston has reached its maximum height when it then provides the power necessary for the operation of the engine.

In the usual piston that is flat on top, or whose apex does not contact the wall of the cylinder, there is more or less of an equal pressure exterted in a direction corresponding to the longitudinal axis of the piston, and hence a loose piston may move to either side of the cylinder 14, in contact therewith, at the moment of the explosion, resulting in a sudden movement to the opposite side causing the so-called piston slap.

To overcome this the plane top 5 of the herein described piston is sloped as shown at 15, whereby on its upward compression stroke the resistance of the encountered gas maintains the piston at the side of the cylinder having the longest bearing, the aligned side, and hence at the time of the explosion there is no lateral movement of the piston and hence piston slap cannot occur.

To determine the proper angle of inclination of the plane top 5 the line of force is assumed to follow the broken and dotted line 16 extending from the center of the wrist-pin 6 to the apex, with the apex so positioned in elevation that the angle will be bisected by the line of force and will include two equal angles.

This slope of the plane top forms an angle with the horizontal, in a piston of this size, 15 degrees and 10 minutes, approximating the maximum angle of inclination of the connecting rod, viz, 14 degrees and 50 minutes, which angle is deemed sufficient to supply the necessary inclination whereby the resistance acting against the piston will maintain the aligned side of the piston in constant contact with the cylinder wall, the reaction being approximately along the line of force.

Let it be here understood that the angles shown are approximate only as pistons of different diameters will probably require a slight variation in these angles, however, under actual trial conditions the piston shown and explained has performed with actually no audible piston slap with 20 thousandths of an inch clearance between the piston and the cylinder wall.

By off-setting the piston, in the manner above mentioned, additional precautions are taken against piston slap in that should the spark be retarded to rather extreme limits, so that firing will take place when the connecting-rod was in the vertical position, or had passed over the center, or for any other reason whereby the short off-set side would be driven against the corresponding side of the cylinder wall, the upper part of the short side of the piston being off-set would not contact the wall 17 to wear the usual recess at the upper part of the cylinder, the rings 7 only contacting the cylinder and giving no material wear except such wear as will be uniform therein throughout the length of the stroke of the piston.

By this arrangement it is obvious that with the piston traveling true the cylinder cannot wear to a taper as in the usual case and that while the wear may occur on the side of the cylinder corresponding to the aligned side of the piston it will be uniform throughout its length.

Therefore with the uniform cylinder the rings are not subjected to undue expansion and contraction occurring at every stroke, the wear on the cylinder wall and piston rings are more uniform, compression is maintained at its maximum, and oil is prevented from passing the closely fitting rings to form carbon and to foul the spark plug, not shown.

In view of the above description a detailed description of its uses in addition to the above is deemed unnecessary.

Having thus described my invention I claim,

1. A piston, comprising a skirting, a ring-bearing portion, and a top portion, all formed integral and eccentrically positioned to provide one elongated aligned side and one short side having a series of off sets, and rings mounted in said ring bearing portion.

2. A piston, comprising a skirting, ring-bearing portion, and a top portion having a plane top all formed integral and having different diameters and eccentrically positioned to provide one aligned side and one short side having a series of off sets and having its plane top sloping to provide an elongated bearing surface on its aligned side, and rings mounted in said ring bearing portion.

3. A piston, comprising a skirting, a ring-bearing portion, and a top portion having a plane top, all formed integral and having different diameters and eccentrically positioned to provide one aligned side and one off set side, a wrist-pin mounted in said skirting, said plane top being sloped to an angle to the aligned side that may be bisected by an imaginary line passing through the center of said wrist-pin to the apex of said top portion, and rings mounted in said portion.

4. A piston, comprising a skirting, a ring-bearing portion, and a top portion having a plane top, all formed integral and having different diameters and positioned to provide one aligned side and one off set side, a wrist-pin mounted in said skirting, said top being sloped and adapted to form equal angles on either side of the line of force passing through the center of said wrist-pin to the apex of the angles and said plane top further having an angle with the horizontal approximating one-half of the sumof the angles of inclination that the connecting rod makes with the vertical at the maximum throw of the crank-shaft and at the spark angle thereof and rings mounted on said piston.

5. A piston, comprising a skirting, a ring-bearing portion, and a top portion having a plane top, all formed integral and having different diameters and eccentrically positioned to provide one aligned side and one off set side to said piston, said off set side receding, a wrist-pin mounted in said frame, a plane top forming, a right angle triangle and having its height extending from and in continuation with the corresponding wall of the skirting, and rings mounted in said piston.

In testimony whereof I affix my signature.

WILLIAM A. MAHER.